Feb. 24, 1953  H. O. KRON  2,629,264
MOTOR-DRIVEN VALVE CONTROL
Filed Jan. 14, 1950  5 Sheets-Sheet 1

INVENTOR
Harold O. Kron
BY
Arthur Middleton
ATTORNEY

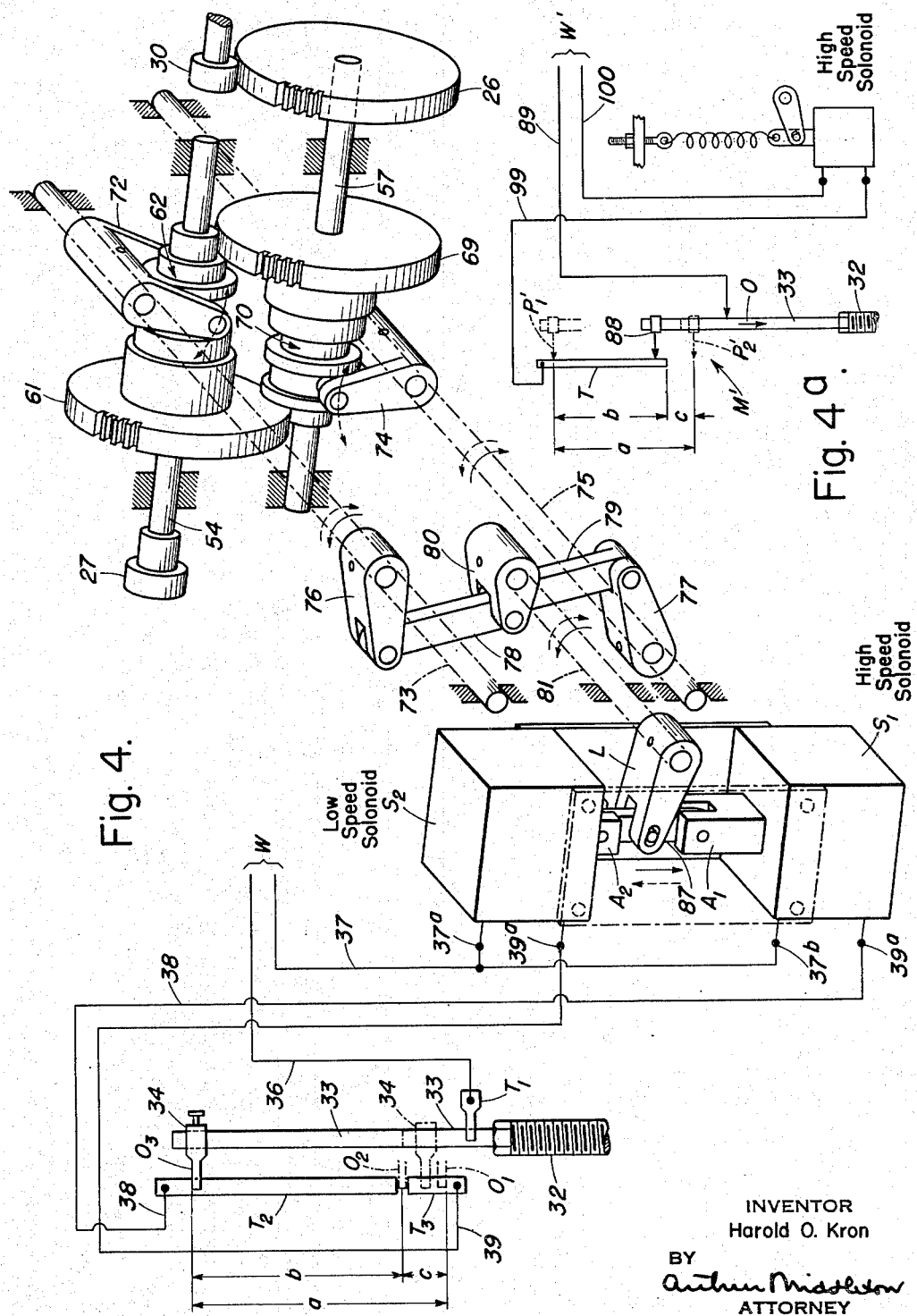

INVENTOR
Harold O. Kron
BY
ATTORNEY

Feb. 24, 1953 H. O. KRON 2,629,264
MOTOR-DRIVEN VALVE CONTROL
Filed Jan. 14, 1950 5 Sheets-Sheet 5
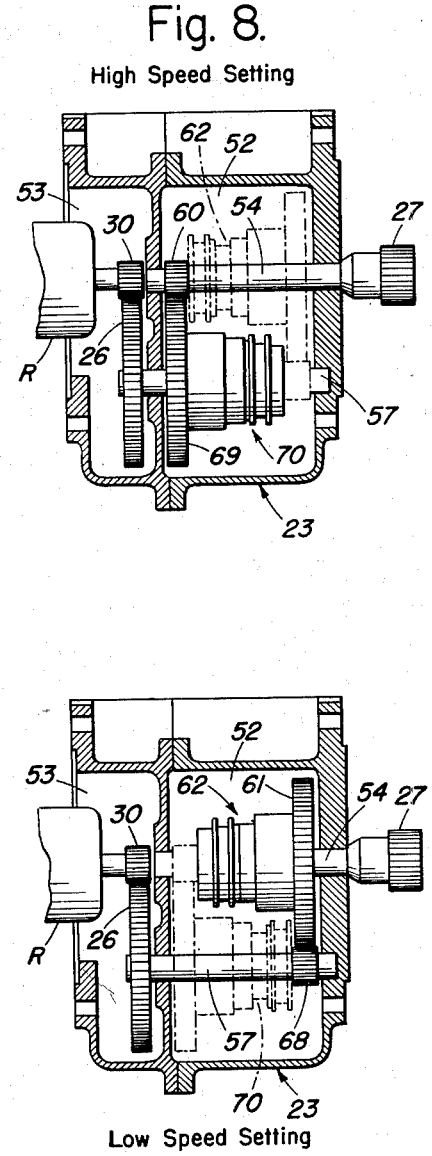
Fig. 8.
High Speed Setting
Fig. 9.
Low Speed Setting
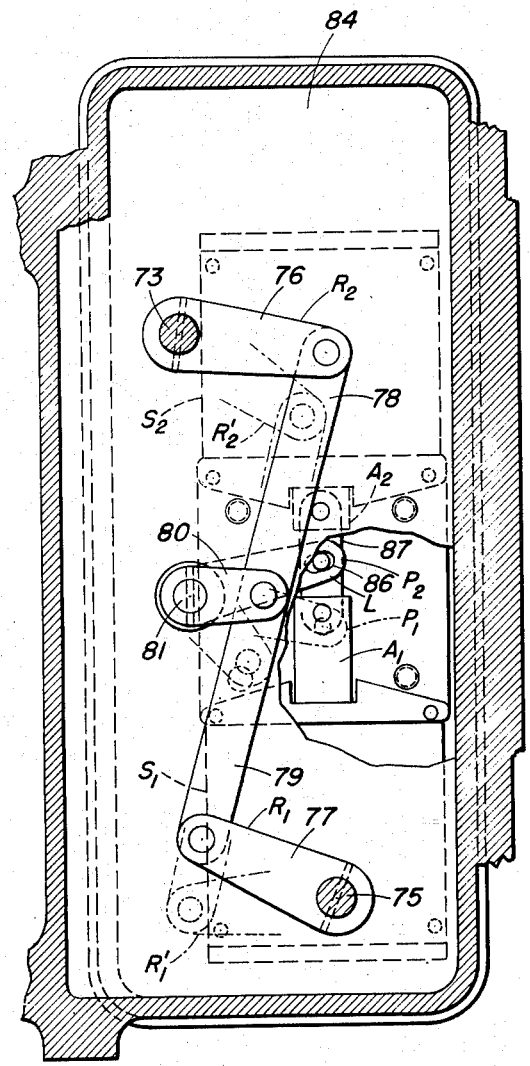
Fig. 7.
INVENTOR
Harold O. Kron
BY
Antrim Middleton
ATTORNEY Patented Feb. 24, 1953

2,629,264

UNITED STATES PATENT OFFICE 2,629,264

MOTOR-DRIVEN VALVE CONTROL

Harold O. Kron, Philadelphia, Pa., assignor to Philadelphia Gear Works, Inc., Philadelphia, Pa., a corporation of Pennsylvania Application January 14, 1950, Serial No. 138,568

13 Claims. (Cl. 74—358)

This invention relates to motor-operated valves, such as plug-, globe-, butterfly-, or gate valves, and more particularly to control devices for the valve-operating mechanisms whereby the opening and the closing movements of the valve are initiated as by push-button operation and stopped automatically by suitable limit stop devices. These movements are effected rapidly as compared with earlier hand-operated valves. The motor-operated mechanism avoids undesirably long delays incident to the closing or opening especially of large size valves by hand-operated mechanism, and facilitates the control from a central station.

More specifically, this invention relates to improvements in the control devices in view of a surge pressure problem arising especially where large motor-operated valves are installed in long pipe lines carrying fluids such as water, oil, or gas. This surge problem is herein also termed the water hammer problem or the hammer blow problem, it being due to whichever kind of the aforementioned fluids the pipe may be carrying. That problem arises when a motor-operated valve closing at the usual motor-controlled rapid rate causes a sudden and dangerous surge or rise in pressure to develop in the pipe at the inflow side of the valve not unlike a hammer blow in its effect.

This phenomenon is explained by the fact that the mass of fluid in forward motion in the pipe if brought to a more or less sudden halt by the rapid closing of the valve exerts its momentum or impact upon the valve, and upon the associated pipe walls, and indeed may react upon the pump station. Hence, the faster the valve closes, the more sudden is the motion of the fluid mass brought to a stop, and consequently the greater is the momentum, impact, and resultant pressure surge.

The development of the surge pressure may assume varying characteristics if plotted in a graph as a function of the closing movement of the valve. The shape of the surge pressure curve in such a graph depends upon the speed of valve-closing as well as upon such local structural factors as pipe diameter and the extent of free length of pipe before and after the valve. For example, under one set of conditions such a graph may represent a curve in which the pressure does not rise appreciably until the valve is in its final closing stage and perhaps only during the last 10% of the closing movement where the pressure curve rises steeply to a pressure value of objectionable magnitude.

Under another set of conditions the pressure rise may develop more gradually in the course of the valve-closing movement although its final magnitude may be objectionably great. Such conditions in pipe lines have been discussed in a paper by S. L. Kerr entitled "Surge Problems in Pipe Lines."

At any rate, such pressure surge is likely to attain a sudden maximum during the final phase of the closing movement of the valve and may reach such dangerously high proportions as would damage the pipe or the valve, or pump station, unless suitable pressure relief measures are provided. Usually there are provided surge pressure responsive relief systems comprising automatic relief valves, check valves, additional piping, and storage facilities for fluid that is allowed to escape from the pipe to prevent excessive surge pressure.

For example, in many instances, especially on high pressure lines it is customary to use by-pass valves in conjunction and in cooperative association with a motor-operated main valve in the line, to accomplish a two-fold purpose. That is, one function of the by-pass valve is to be kept open while the motor-actuated main valve is being closed slowly in order to prevent surge. The other function of the by-pass valve is that when a large diameter pipe line valve is to be opened, the by-pass valve is opened first for the purpose of equalizing to a large extent the pressure of the fluid on the valve disc so that the valve may be easily opened.

While this invention applies to any type of valve, be it a plug-, a butterfly-, or a gate valve, for convenience the invention will hereinafter be described by referring to the gate type of valve which is opened and closed by the axial non-rotating movement of a threaded stem or spindle moving in a power-rotated sleeve-like nut—which is confined against movement in axial direction.

Indeed, the invention will herein be exemplified in and by controls governed by the axial movement of the spindle the extent of which movement is identical with the extent of travel of the gate member in the valve.

It is one object of this invention to avoid the need for the aforementioned surge-preventing by-pass valves and appurtenances by providing automatic controls for sufficiently retarding the closing movement of the gate member substantially during that phase thereof where otherwise an objectionable rise in surge pressure would occur. By sufficiently retarding is meant that the slow-down should extend over the critical portion of the gate travel and should be sufficiently slow to allow the surge to be absorbed to a degree desired.

To this end the invention provides for a two-speed change gear drive for the valve-actuating mechanism and monitor means for automatically controlling the change from high to low speed at a desired point of the closing movement of the gate, to allow the gate to move at slow surge-absorbing speed until seated incident to automatic stoppage of the drive.

Another object is to provide automatically increased initial power for opening the valve. This is allowed by a two-speed drive for actuating the valve so that it initially operates in low speed and then automatically changes to high speed.

Still another object is to provide an attachment whereby existing motor-operated valve units installed in the field can be converted into two-speed units for the purpose of this invention.

This object is attained by providing a two-speed change gear box insertable between the existing motor and the existing valve-operating mechanism proper.

According to one feature the movement of the gate or spindle actuates switches for electrically actuating the gear change by actuating a set of suitable clutches.

According to a more specific feature the clutches are actuated by solenoid power.

A feature even more specific provides for the change gear, normally held in "low" by mechanical spring power to be automatically shifted into high by the power of a solenoid energized to execute the shift when the valve-actuating mechanism starts its closing movement of the gate. Thus, should the electric power supply fail, the mechanism will operate safely in low gear whether opening or closing.

According to still another feature, the valve-actuating mechanism operates in low gear at low speed when starting the opening movement, and thereafter automatically shifts into high gear to move the gate at the higher speed to the end of the opening movement when the drive is automatically stopped.

Another feature provides adjusting devices for varying the point of speed change related to the movement of the gate.

According to another feature existing units of motor-operated valves can be converted into two-speed units by interposing between certain sections of existing valve units, namely between the motor and the actuating mechanism proper, a two-speed gear box which when inserted becomes unitary with the actuating mechanism without change of existing parts and without otherwise disturbing the valve unit as installed.

According to another feature a two-speed gear box is attached to an existing valve construction in which an encased motor has a flange connection with the casing of the valve-actuating mechanism, and in which a pinion fixed on the inner free end of the motor shaft meshes with an exposed gear which is part of the valve-actuating mechanism. The valve-actuating mechanism is herein also briefly termed the actuator mechanism while its casing is termed the actuator casing. The two-speed gear box is inserted between and flange connected to the motor housing and to the actuator casing. The gear box presents at one end an exposed gear simulating or corresponding to the exposed gear of the actuator mechanism and to mesh with the motor pinion, and at the other end an exposed pinion simulating or corresponding to the motor pinion and meshing with the exposed gear of the actuator mechanism.

In one embodiment of this invention the two-speed gear box has two shafts—a main shaft and a countershaft journalled in the end walls of the gear box, change gears mounted upon the shaft and a clutch on each shaft shiftable in unison so that the motor pinion may either drive the actuator mechanism directly and at high speed through the main shaft, or indirectly and at low speed through the countershaft. That is to say, the clutches are operatively so interconnected or interlocked that by causing one clutch to be engaged, the other clutch becomes disengaged and vice versa. This shifting of the clutches in one direction is effected automatically at a predetermined although adjustable point of the valve-closing movement, and is effected automatically in the opposite direction when the valve gate reaches substantially the same point during its opening movement. In this way the movement is automatically stepped down from high to low while closing and stepped up from low to high while opening the valve. This affords the desired surge-preventing slow speed for seating the valve gate as well as extra power for unseating it.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Other features and advantages will appear as this specification proceeds.

In the drawings:

Fig. 4 is a perspective view of the reciprocable solenoid-actuated two-speed mechanism with parts drawn apart.

Fig. 4a shows another embodiment of the solenoid power means for actuating the speed change mechanism at low speed throughout the operating cycle of the valve in case of solenoid failure.

Fig. 7 is a sectional view taken on line 7—7 of Fig. 5.

Fig. 8 is a schematic and reduced sectional view, otherwise similar to Fig. 6 of the two-speed gear box set for high speed drive, with the then inactive parts shown in dotted lines.

Fig. 9 is a view similar to Fig. 8 although with the gear box set for low-speed drive, and with the then inactive parts shown in dotted lines.

Figure 1:
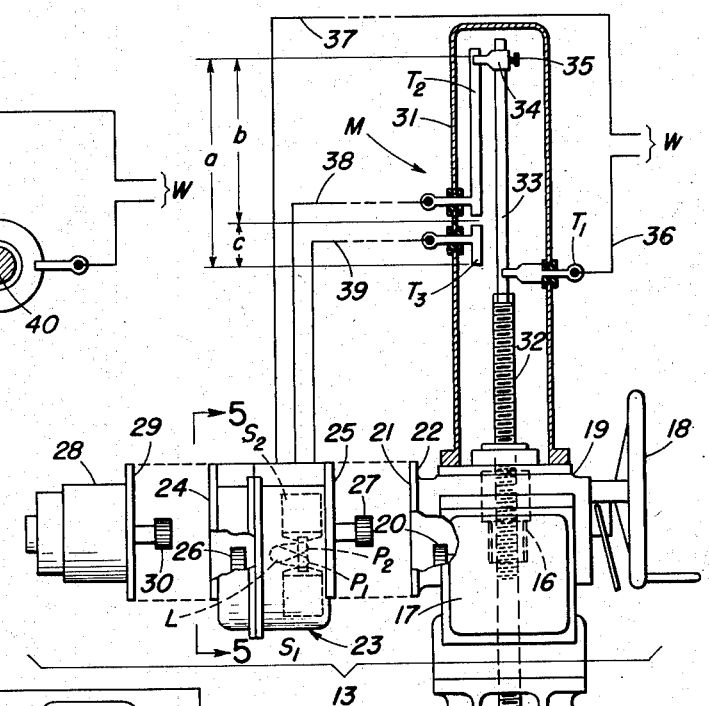
Fig. 1 is a general more or less schematic part-sectional view of a gate valve unit embodying the invention with parts of the drive mechanism drawn apart to illustrate the converting of a standard gate valve unit into a two-speed unit, also showing switch means actuated by the rectilinear motion of the gate to effect speed change.
Figure 2:
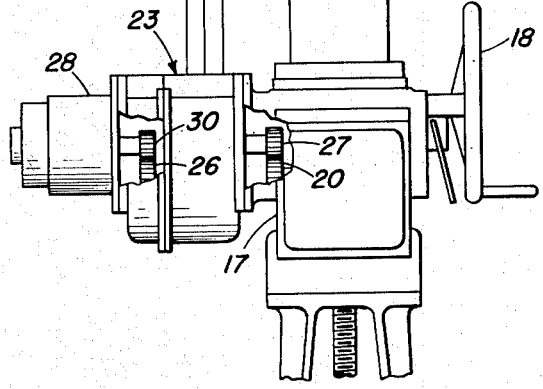
Fig. 2 is a view of the top portion of the device of Fig. 1 showing the drive mechanism assembled for two-speed operation.

In an overall view of Figs. 1 and 2 a power-actuated gate valve unit comprises a valve body 10, a valve cover 11, a yoke 12 carrying powered valve-actuating devices 13, and a gate valve member 14 having a threaded spindle 15. This spindle and thus the gate member perform a rectilinear movement when opening or closing the valve by the rotation of a sleeve-like yoke nut 16 driven by the devices 13. Such a power driven unit has limit switch devices for automatically cutting the power to stop the movement of the gate member at the end of its closing or opening travel, such limit switch devices being here indicated merely by switch box 17. Usually stand-by mechanism for actuating the spindle is indicated by a handwheel 18.

The actuating devices 13 comprise a casing 19 in which the sleeve nut 16 is mounted for rotation although secured against axial displacement. The casing 19 also contains a gear train or suitable gearing for rotating the nut 16, such gear train being indicated by an input gear 20. The casing 19 has a lateral opening or input end 21 provided with a flange 22 so that a two-speed gear box 23 may be connected thereto. This gear box has an input end 24 and an output end 25, and contains two-speed gearing having an input gear 26 and an output pinion 27. Driving relationship between the two-speed gearing in the gear box 23 and the gearing in the casing 19 is established by output pinion 27 meshing with input gear 20 (see Fig. 2). An actuating member or lever L upon the gear box 23 is reciprocable between high-speed and low-speed position for changing speeds from high to low and from low to high in accordance with the requirements of this invention. Indeed, the gear box 23 also contains power means in the form of a pair of solenoids $S_1$ and $S_2$ (diagrammatically indicated in dotted lines in Fig. 1) connected to the actuating lever L and alternatingly energizable so as to throw the lever L from high-speed position to low-speed position or from low-speed position to high-speed position, as indicated by positions $P_2$ and $P_1$ of lever L.

The two-speed gear box 23 is powered by a motor unit 28 having a flanged output end 29 and an output pinion 30. Connecting the motor unit to the two-speed gear box establishes driving connection by output pinion 30 meshing with input gear 26 (see Fig. 2).

The top end portion of spindle 15 extending upwardly from casing 19 is operatively associated with monitor devices M controlled by the travel of the spindle for automatically changing the driving speed transmitted by gear box 23 from high to low or from low to high as the case may be at a suitable predetermined point of such travel.

The two-speed gear box 23 also contains power means for reciprocating the speed change lever L between high-speed position and low-speed position, indicated at $P_1$ and $P_2$ respectively, one embodiment of such power means being in the form of a pair of solenoids $S_1$ and $S_2$ which are alternatingly energizable. If solenoid $S_1$ is energized (while solenoid $S_2$ is de-energized) it will move the lever L into high-speed position; if solenoid $S_2$ is energized (while solenoid $S_1$ is de-energized) it will move lever L into low-speed position. To effect speed change the solenoids $S_1$ and $S_2$ must be actuated in this manner at a predetermined point of gate travel to throw the lever L either in the one or the other direction as the case may be. That is to say, during gate closing after the spindle 15 has moved the portion $b$ of its total travel $a$ at high-speed, a power impulse should automatically throw the lever L from its high-speed position to its low-speed position so that during the balance $c$ of its closing travel the spindle or gate will move at low-speed and will close gently until automatically stopped by limit switches in switch box 17. Conversely, when the gate opens it should do so at low speed and continue at that speed through the distance $c$ whereupon a power impulse should automatically throw lever L from its slow-speed position to its high-speed position, so that the gate may complete its opening movement through the distance $b$ at high speed until automatically stopped by the limit switch in switch box 17.

For effecting such speed change at a predetermined point of gate travel the aforementioned monitor devices M are operatively associated with and responsive to the opening and closing movements of the gate or spindle. Such monitor means are shown to comprise electrical switch mechanism in circuit with the solenoids $S_1$ and $S_2$ and mounted and housed in a hood 31 surrounding the upper end portion 32 of spindle 15 and mounted upon gear casing 19.

The switch mechanism comprises an extension rod 33 coaxial with and screwed into the top end of spindle 15. A stationary terminal $T_1$ is mounted in the wall of hood 31 and has sliding contact with the extension rod 33 during the gate opening and closing movements thereof. This extension rod carries a contact member 34 adjustable along the rod as indicated by a set screw 35. As the spindle moves to close the valve the contact member 34 has sliding contact first with a long terminal rail $T_2$ and then with a short terminal rail $T_3$, the effective lengths of these terminal rails or terminals corresponding to the distances $b$ and $c$ representing the high-speed and low-speed portion respectively of the total length $a$ of gate travel.

A power supply for actuating the solenoids is indicated at W with a conductor 36 leading from the power source to terminal $T_1$, and another conductor 37 leading from the power source to the solenoid power means in the gear box 23. Conductors 38 and 39 lead from terminals $T_2$ and $T_3$ respectively also to the solenoid power means in gear box 23.

Figure 3:
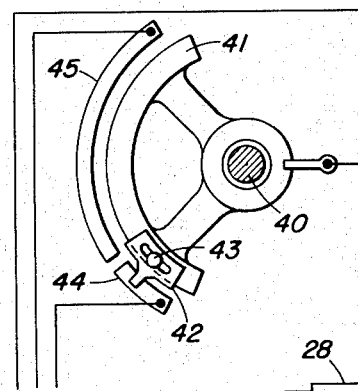
Fig. 3 shows two-speed controlling switch means adapted for rotary motion.

In the Fig. 3 embodiment a rotary movement is substituted for the rectilinear movement of the spindle 15. Therefore, a rotary member 40 representing the movement of a valve member is shown to be unitary with an arcuate member or segment 41 which carries a contact member 42 adjustable along the periphery of the segment as indicated by a set screw 43. The contact member 42 sequentially contacts a pair of stationary arcuate terminal rails 44 and 45 which correspond to the short terminal rail $T_3$ and the long terminal rail $T_2$ of the Fig. 1 embodiment.

Referring to Figs. 4 to 9 there will now be described the interior as well as the operation of the gear box 23 containing the two-speed gear mechanism as well as the solenoid power means for actuating the same.

Figure 5:
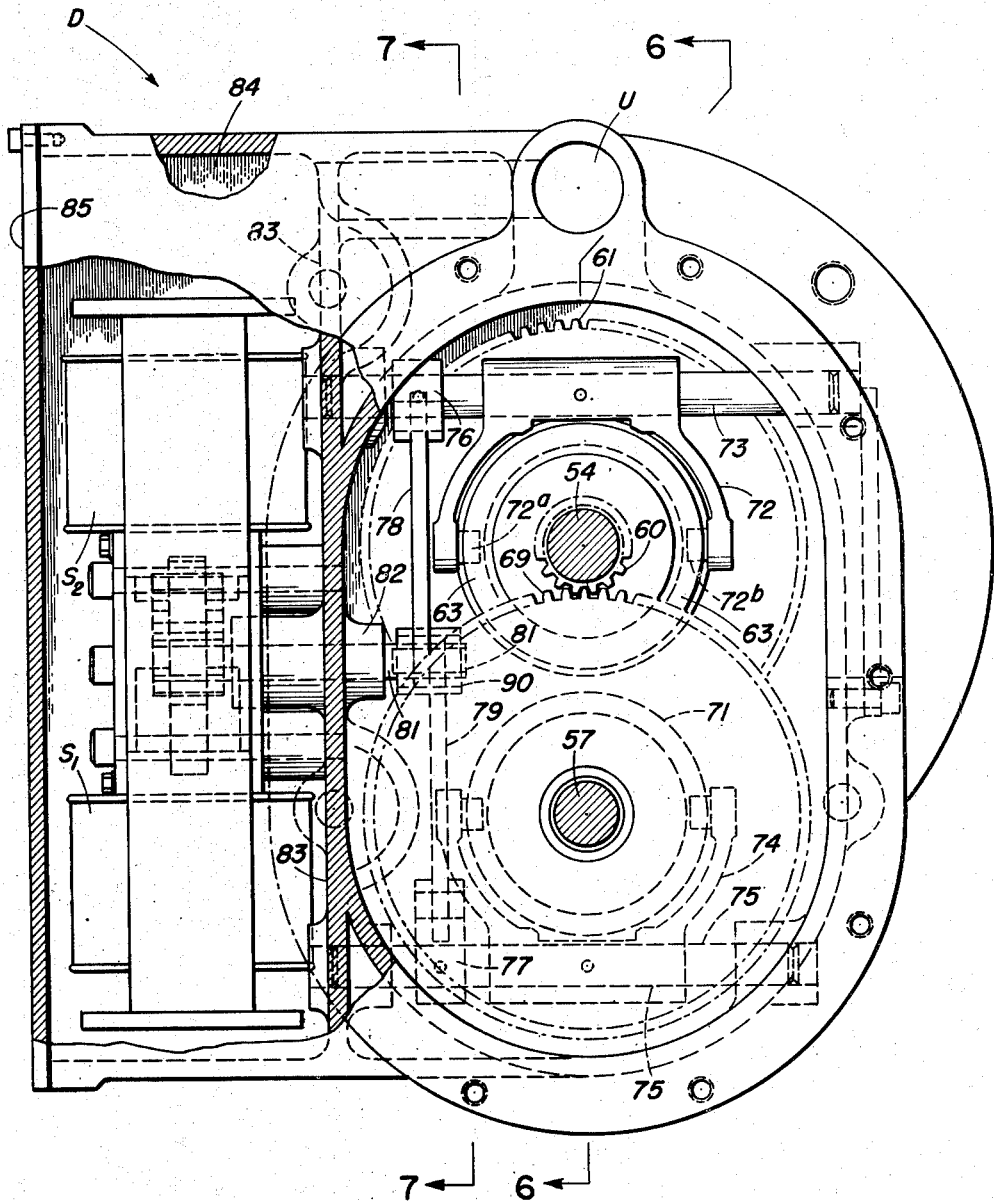
Fig. 5 is a part-sectional end view upon the input end of the individual two-speed gear box taken on line 5—5 of Fig. 1.
Figure 6:
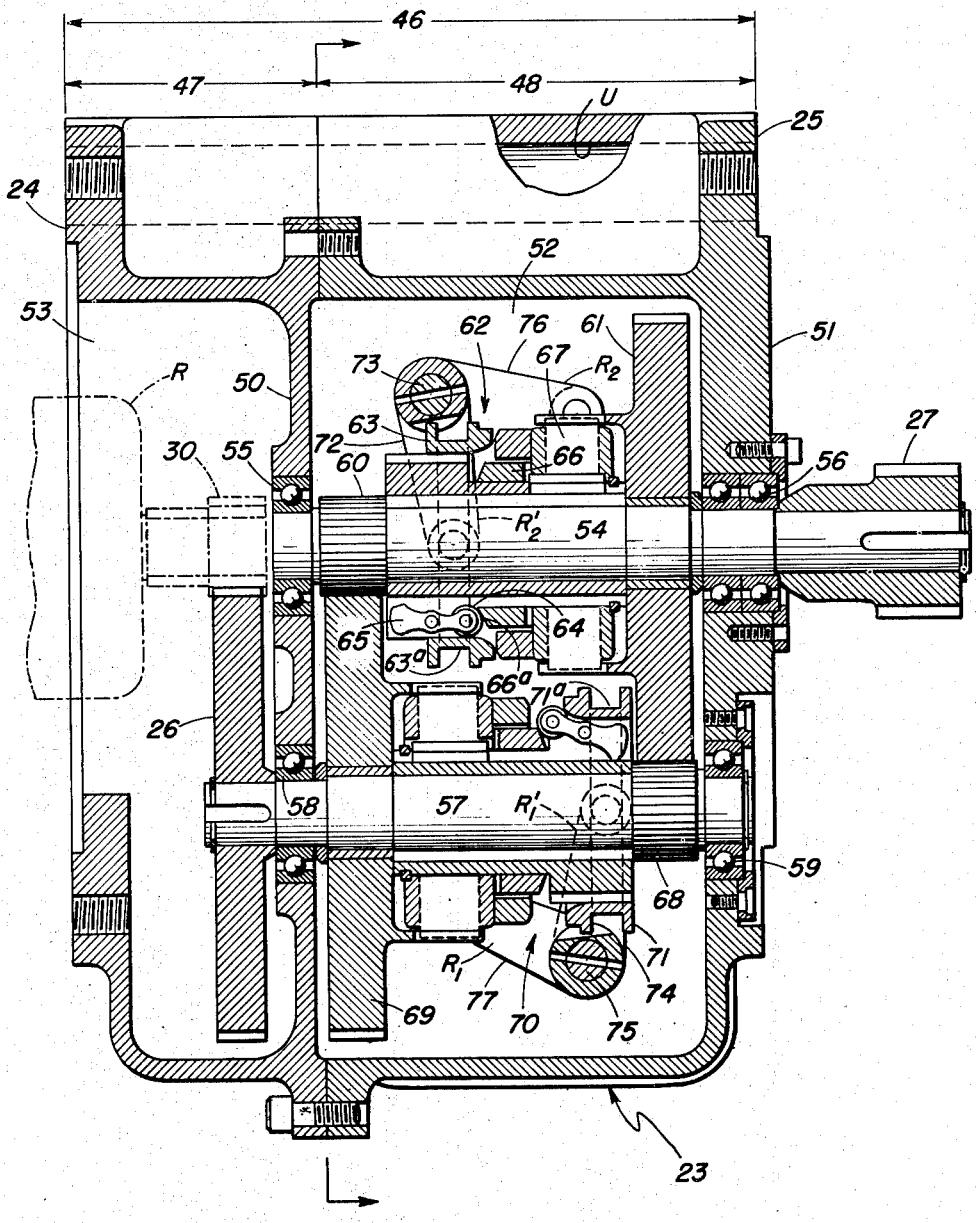
Fig. 6 is a longitudinal sectional view taken on line 6—6 of Fig. 5.

While Figs. 5, 6 and 7 present structural sectional views of the gear box 23, it is by the perspective of Fig. 4 and by the operational views of Figs. 8 and 9 that the function of the mechanism appears most clearly, the perspective view of Fig. 4 being taken upon Fig. 5 viewed in the general direction of arrow D.

The two-speed mechanism is housed or mounted in a casing 46 which is split into two sections herein termed the input section 47 and the output section 48, these sections being interconnected by an intermediate flange and bolt connections 49. The ends of this casing present the flanged input end 24 and the flanged output end 25. The sections 47 and 48 have end walls 50 and 51 respectively defining a closed main gear chamber 52 and an open auxiliary gear chamber 53. The gear casing 46 is formed to have integral therewith a longitudinal duct U through which may extend electrical leads between motor unit 28 and the limit switch box 17.

A main shaft 54 herein also termed the high-speed shaft is mounted to rotate in the end walls 50 and 51 by means of ball bearings 55 and 56. A countershaft 57 extending parallel to the main shaft is similarly mounted by means of ball bearings 58 and 59. The main shaft 54 has an end portion herein termed the output end which extends beyond the end wall 51 and carries fixed thereon the output pinion 27. The countershaft herein also termed the low-speed shaft has an end portion herein termed the input end portion which extends beyond the end wall 50 and carries fixed thereon the input gear 26.

The main shaft 54 has fixed upon it a pinion 60 disposed adjacent to end wall 50 and to roller bearing 55, and it also carries a large loose gear 61. Interposed between the pinion 60 and the loose gear 61 is a first clutch 62 herein also termed the high-speed clutch which of itself is of a known construction whereby the loose gear can be coupled to or uncoupled from the shaft 54 by axially shifting a shift ring or collar 63 having an annular groove 63ª. This collar rotates with the shaft 54 and if shifted towards the gear 61 it will depress a set of cam rollers 64 mounted on rockers 65 unitary with the shaft 54, which cam rollers bear down upon a cam face 66ª of a cam ring 66 moving it to engage the gear 61 to the shaft by compressing familiar clutch leaves indicated at 67. The clutch 62 in Fig. 6 is shown to be thus engaged.

The countershaft 57 has fixed on it a pinion 68 disposed adjacent to the end wall 51 and to roller bearing 59, while a gear 69 of the same pitch diameter as gear 26 is loose upon that shaft and disposed adjacent to the end wall 50 and to roller bearing 58. A second clutch 70 herein also termed the low-speed clutch is interposed between pinion 68 and gear 69 and is operable for making or breaking the drive connection between the gear 69 and shaft 57, the clutch itself being identical to clutch 62 and operable by moving its shift ring or collar 71 by way of its annular groove 71ª.

Actuating mechanism is provided whereby the clutches 62 and 70 are operationally so interlocked that when one clutch is being engaged the other becomes disengaged and vice versa. In other words, the gear box 23 is set for high-speed operation (see also Fig. 8) when clutch 62 is disengaged for gear 69 to rotate with countershaft 57 due to clutch 70 being engaged, and gear 69 meshing with pinion 60 to rotate the high-speed shaft 54. The gear box 23 is set for low-speed operation (see also Fig. 9) by reversing the condition of the clutches to engage clutch 62 and disengage clutch 70, so that gear 61 is connected to main shaft 54 while gear 69 becomes disconnected from countershaft 57. Pinion 30 meshing with gear 26 then rotates the countershaft 57 together with pinion 68 which in turn meshes with gear 61 to rotate the main shaft 54.

Clutch 62 is actuated by a rockable fork 72 having a pair of pins 72ª and 72ᵇ lodging in the annular groove of shift ring 63. The fork 72 is unitary with a rocker shaft 73 disposed above and extending transversely of main shaft 54 and journalled in the side walls of gear chamber 52. Similarly clutch 70 is actuated by a rockable fork 74 unitary with a rocker shaft 75 disposed underneath and extending transversely of countershaft 57 and parallel to rocker shaft 73 and journalled in the side walls of gear chamber 52.

The rocker shaft 73 has fixed thereto an arm 76 and the rocker shaft 75 has a similar arm 77, both arms pointing in direction opposite to each other. Both arms are operatively interconnected by a pair of links 78 and 79 the outer ends of which are connected to arms 76 and 77 respectively while their inner ends are both connected to a common actuating arm 80 fixed upon a master rocker shaft 81 which is rockable in a bearing portion 82 of side wall 83 of gear chamber 52. Indeed this side wall 83 constitutes a portion of a chamber 84 extending laterally from the casing portion 48. The inner end of master rocker shaft 81 thus extends into gear chamber 52 while its outer end extends into the lateral chamber 84 the outer end of which is closed by removable closure plate 85.

The outer end of master rocker shaft 81 has fixed upon it the aforementioned primary actuating arm or lever L herein also termed a reciprocable actuating member which is operatively connected to the pair of aforementioned solenoids $S_1$ and $S_2$. That is to say, the arm L has its outer end connected as by slot and pin connection 86 to a link 87 which interconnects armature $A_1$ and $A_2$ of the solenoids. The solenoids by being alternately energized will rock the primary actuating arm L and thereby the rocker arms 76 and 77 between low-speed and high-speed positions as indicated (see Fig. 7) by the full line positions $R_1$ and $R_2$ and the dot-and-dash line positions $R_1'$ and $R_2'$ of these arms.

According to Fig. 4a the monitor means comprise the rod 33 on spindle 32, an adjustable contact member 88 on the rod, and a terminal rail member T engaged for sliding contact with the contact member 88. The function of this rail member corresponds to that of rail member $T_2$ (of Fig. 4) and therefore also to the length $b$ of high-speed travel of the valve spindle. For the duration of that portion of the travel a circuit supplied by an electrical power source W' is kept closed through rail T and rod 33 by means of conductors 89, 99, 100 so as to energize a solenoid S which holds the actuating lever L in high-speed position. During the portion $c$ of the valve closing movement of the spindle the circuit is broken and the solenoid S de-energized, so that a spring G' may hold the lever L in its low-speed position. Thus, in case of failure of the solenoid to function, the entire valve operating cycle which includes opening and closing will function at low-speed as the lever L is being held in low-speed position by the spring throughout the cycle. Adjusting means for varying the tension of the spring are indicated at J. The topmost and lowermost positions of contact member 88 are indicated at $P_t$ and $P_l$ respectively, while an intermediate position is shown at $P_i$.

*Operation*

Let the operation start with the valve closed and the two-speed gear box 23 set for low-speed in accordance with the Figs. 4 and 9 position of the parts. If motor 28 is started it begins to rotate the nut 16 in a direction whereby the valve member 14 is raised from its seat to open at low-speed. Let it be assumed that the starting motor also closes the solenoid-energizing circuit fed by power source W so as to energize solenoid $S_2$ which is herein also termed the low-speed solenoid. This holds the armature $A_2$ drawn into the low-speed solenoid $S_2$ insuring the position of the parts as shown in Fig. 4 to be maintained as long as contact member 34 slides upwardly upon the short contact rail $T_3$ from its lowermost position $O_1$ to an intermediate position $O_2$ whence continued upward movement of spindle 32 will move it onto the long contact rail $T_2$.

That is to say, while contact member 34 moves along contact rail $T_3$ through a distance $c$ it will maintain an energizing circuit for the low-speed solenoid $S_2$ through conduit 36 leading from power source W to stationary contact member $T_1$, rod 33 (which is insulated against spindle 32), contact member 34, short contact rail $T_3$, conduit 39, to terminal $39^a$ of one end of a solenoid coil in solenoid $S_2$ the other terminal $37^a$ of that coil being connected through conduit 37 to power source W while a conduit 38 and the solenoid $S_1$ carry no current.

As the valve member and spindle 32 continue rising the contact member 34 passing through position $O_2$ leaves contact rail $T_3$ to engage contact rail $T_2$ thereby breaking the energizing circuit for solenoid $S_2$ while making an energizing circuit for solenoid $S_1$, thus drawing the armature $A_1$ downwardly and moving the primary actuating lever L from its low-speed position $P_2$ to its high-speed position $P_1$ (see Figs. 1 and 7). The energizing circuit for the high-speed solenoid is established from power source W, through conduit 36, stationary terminal $T_1$, insulated rod 33, contact member 34, long contact rail $T_2$ connecting through conduit 38 with terminal $38^a$ of a solenoid coil in solenoid $S_1$, the other terminal $37^a$ of the solenoid coil, and finally through conduit 37 leading back to power source W. The solenoid $S_1$ is maintained thus energized for the duration of travel through distance $b$ of the valve member, that is, while contact member 34 slides along contact rail $T_2$ and until it reaches its upper limit position $O_3$ at which time automatic limit switch devices in box 17 stop the upward opening movement of the valve member by cutting the power of motor 28.

If the motor is started to run in reverse direction to start the valve member on its downward closing stroke, the member will move at high-speed for the duration of travel through distance $b$ since the gear box 23 was last set for high-speed and a solenoid energizing circuit initiated together with the start of the motor holds it so by way of the long contact rail $T_2$. Again, as the downward movement of the valve member continues and the contact member moves off the long rail $T_2$ and onto the short rail $T_3$, the low-speed solenoid $S_2$ will become energized while solenoid $S_1$ becomes de-energized, thus moving the actuating lever L from its high-speed position $P_1$ to its low-speed position $P_2$ and accordingly moves the valve member at low-speed for the duration of travel through the balance $c$ of its closing stroke at the end of which the driving power of the motor is again automatically cut by the functioning of the limit switch devices in box 17.

In order to change the point of speed change if it be desired to change the proportion of the distances $b$ and $c$ with respect to each other, such change can be effected by changing the setting of the contact member 34 upon rod 33.

Although the invention is herein being described as embodied in a mechanism in which two-speed control is effected electrically by means of solenoids, such control within the scope of this invention may also be effected by power means or motion-imparting devices other than electrical, for example, by means of devices actuated by pressure fluids such as compressed liquid, compressed air, or devices actuated by steam. Therefore, the term "power means" should herein be understood in that broader sense.

Because this invention applies to valve constructions of various types, including those in which the valve member performs a rotary motion, the term "reciprocating" or "reciprocable" as used within the scope of this invention applies to the opening and closing travels of the valve member irrespective of whether these movements be rectilinear or rotary. Also, the term reciprocating or reciprocable includes both rectilinear and rotary movement as applied to the movement of the clutch-actuating member.

With respect to power means for operating the clutches through the primary actuating lever L, power means other than the solenoids shown may be employed, for example, hydraulic fluid-operated or compressed-air operated devices, or devices operated by steam may be employed for effecting the speed change in the valve-actuating mechanism.

A monitor system for effecting the speed change while deriving its primary impulse from the movement of the valve member, may include a transmission system other than the one shown in the present embodiment. The system may include any suitable kind of relay or timing devices, and it may include, for example, a timing clock-work which starts automatically as the valve member starts moving and which in turn can be set to actuate electrical relay devices to effect speed change at the desired point of the movement of the valve member.

I claim:

1. A valve unit having an openable and closeable valve member, a moving stem and power operated drive means for operating the stem and valve member to open and to close it as well as for automatically stopping the valve member at the end of each of its strokes; characterized by a two-speed gear change mechanism in the drive means comprising a primary shaft, a primary input pinion fixed to the input end of the primary shaft, a larger primary gear rotatable upon said primary shaft and spaced from the input pinion towards the output end of the shaft, a first clutch upon said primary shaft between said pinion and said larger primary gear for connecting said larger primary gear to the primary shaft, a countershaft, a secondary larger gear rotatable upon the countershaft and meshing with said primary input pinion, a secondary pinion fixed upon the output end of the countershaft and meshing with said larger primary gear, a second clutch upon the countershaft between said larger secondary gear and said secondary pinion for connecting said secondary gear to the countershaft, interlocking means effective between the clutches and operable between low-speed position and high-speed position by engaging one clutch while disengaging the other and vice versa, power means for operating the interlocking means, and control transmitting means governed by the travel of the moving stem for transmitting control to the power means whereby said interlocking means are maintained in high-speed position during the first portion of the closing movement of the valve member, then are moved to low-speed position at the end of said first portion, and then maintained in low-speed position during the remainder of the closing movement, so that the valve member moves at high speed during said first portion and at low speed during the remainder of the closing movement.

2. A valve unit having an openable and closeable valve member, a moving stem and power-actuated gear drive means adapted for automatically stopping the movement of the valve member at the end of its opening and its closing comprising a gear train connected with the stem and valve member and having a first power-input gear, a gear casing surrounding the gear-train and having a flanged input end the plane of which extends parallel to the plane of the input gear, a two-speed gear box having an output end flange connected to the input end of the casing, two-speed gearing in the gear-box having an output pinion meshing with the first input gear and having a second input gear and also having an actuating member movable between high-speed and low-speed positions and thus settable for operating the two-speed gearing at high speed and at low speed respectively, extending parallel to the first input gear, a motor unit having a flange connection with the input end of the gear box and having an output pinion meshing with the second input gear, and control transmitting means governed by the travel of the moving stem for transmitting control to the actuating member whereby said actuating member is maintained in high speed position during the first portion of the closing movement of the valve member, is moved to low speed position at the end of said first portion, and is maintained in low speed position during the remainder of the closing movement so that the valve member moves at high speed during said first portion and at low speed during the remainder of the closing movement, said gear box being detachable from between the gear casing and the motor while said motor unit is attachable to the input end of the gear casing with the output pinion of the motor unit meshing with the first-mentioned input gear in the gear casing.

3. A two-speed gear shift mechanism for embodiment in a valve unit of the type that has an openable and closeable valve member, a moving stem and power-actuated drive means for operating the stem and valve member to open and to close it as well as for automatically stopping the movements of the valve member at the end of its opening and closing strokes that comprise a gear casing, a gear train in the casing connected with the stem and valve member and having an input gear, and a motor unit adapted to be flange-connected to the gear casing and having an output pinion for meshing with said input gear, two-speed mechanism interposable between the motor unit and the gear train to move the valve member at high speed during the first portion of its closing stroke and at low speed during the remainder of such stroke and vice versa during its opening stroke, said mechanism comprising a gear box interposable between the motor unit and the gear casing with the input end of the gear box flange-connected to the motor unit and the output end of the gear box flange-connected to the gear casing, two-speed gearing in the gear box having an input gear meshing with the output pinion of the motor unit, an output pinion meshing with the input gear in the gear casing, a primary shaft fixed to said input gear and a countershaft fixed to said output pinion, both shafts being journalled in the gear box, a primary pinion fixed upon the input end of the primary shaft, a primary larger gear rotatable upon the primary shaft at the output end thereof adjacent to the output pinion yet axially non-displaceable upon the shaft, a clutch between the primary pinion and the primary larger gear for connecting the larger gear to the shaft, a secondary larger gear rotatable upon the countershaft and meshing with the primary pinion, a pinion fixed upon the output end of the countershaft meshing with the primary larger gear, a clutch between the secondary pinion and the secondary gear for connecting the secondary gear with the countershaft, interlocking means between the two clutches operable to engage the one clutch while disengaging the other clutch to change the movement of the stem and valve member from high speed to low speed and vice versa and comprising an actuating member movable between high-speed and low-speed positions and thus settable for operating the two-speed gearing at high speed and at low speed respectively; and control transmitting means governed by the travel of the moving stem for transmitting control to the actuating member whereby said actuating member is maintained in high-speed position during the first portion of the closing movement of the valve member, is shifted to low-speed position at the end of said first portion, and is maintained in low-speed position during the remainder of the closing movement, so that the valve member moves at high speed during said first portion and at low speed during the remainder of the closing movement.

4. A two-speed gear shift mechanism according to claim 3, with the addition of power means for operating the interlocking means to effect the required change between high-speed and low-speed movements of the valve member.

5. A two-speed gear shift mechanism according to claim 3, with the addition of power means for operating the interlocking means having a pair of solenoids alternatingly energizable for reciprocating the actuating member in a manner to effect the required change between high-speed and low-speed movements of the valve member.

6. A two-speed gear shift mechanism according to claim 3, in which the interlocking means comprise spring holding means for normally urging the gear shift member into low-speed position, and reciprocable means energizable for moving the actuating member to effect the required change between high-speed and low-speed movements of the valve member.

7. A valve unit having an openable and closeable valve member, a moving stem and power operated drive means for operating the stem and valve member to open and to close it as well as for automatically stopping the valve member at the end of each of its strokes, a two-speed gear mechanism in the drive means having actuating members movable to change the gear mechanism from high-speed to low-speed and vice versa, operating means associated with the actuating members to cause changing from high speed to low speed, power means for motivating the operating means, a common member interposed between the power means and the operating means operable by the power means for causing movement of the operating means to change the speed through moving the actuating members, and control transmitting means governed by the movement of the moving stem for transmitting control to the power means, whereby the gear mechanism is maintained in high-speed drive during a portion of the movement of the stem and then is changed to a low-speed drive during the remainder of the movement of the stem so that the valve member is driven at high-speed during a portion of its movement and at low-speed during the remainder of its movement.

8. A valve unit as set forth in claim 7 in which the actuating members are clutches interposed in the gear mechanism and the operating means are yoke members mounted on shafts carried by a casing containing the gear mechanism, the shafts having arms thereon connected together by links and operated by the common member from the power means to change the speed of the gear mechanism.

9. A valve unit as set forth in claim 7 in which the operating means are shafts having arms mounted thereon, the arms being interconnected by links and the common member is an arm connected to the power means and the links to actuate the operating means to change the speed of the gear mechanism.

10. A valve unit as set forth in claim 7 in which the gear mechanism comprises a high-speed train of gears and a low-speed train of gears with clutches in each train to engage one train while disengaging the other train to drive the moving stem at a predetermined speed, the operating means comprising yoke members engaging the clutches to change the speeds of the gear trains and shafts having arms mounted thereon, the arms being interconnected by links, and the common member being an arm operatively connected to the power means and to the links to operate the clutches through the operating means upon control of the power means.

11. A valve unit as set forth in claim 7 in which the common member is an arm and the power means is a pair of solenoids having an armature in each being interconnected and the common member being connected to the armatures so as to be operated thereby, the common member being operatively connected to the operating means to move the actuating members in accordance with the energization of the solenoids.

12. A valve unit as set forth in claim 7 in which the power means comprises a pair of solenoids each having an armature controlled thereby the armatures being interconnected, the common member being connected with and operated by the armatures, and the control transmitting means being a switch included in a circuit with the solenoids, the switch being operated by the movement of the moving stem to energize a selected solenoid actuating its respective armature to operate one of the actuating members through the common member and the operating means to cause drive of the moving stem at a selected speed.

13. A valve unit having an openable and closeable valve member, a moving stem, power operated drive means for operating the stem and valve member to open and to close it as well as for automatically stopping the valve member at the end of each of its strokes, comprising a two speed gearing mechanism within a housing having a high-speed train of gears and a low-speed train of gears with each train of gears having a clutch operatively associated therewith, yoke members mounted on shafts within the housing for engaging the clutches to control the selected speed of the gear mechanism, arms mounted on each of the shafts interconnected by links with an actuating arm at the point of interconnection of the links with the actuating arm being carried by a shaft extending outside of the housing, an operating lever mounted on the other end of the actuating arm shaft, a pair of solenoids each having an armature with the armatures being interconnected with the operating lever mounted within the interconnection, a circuit including a switch member and the solenoids with the switch member being controlled by the movement of the moving stem and when the switch is closed a selected one of the solenoids is energized for actuating its respective armature causing movement of the operating lever and the actuating arm as well as the yoke members through the respective shafts and links to cause engagement of a selected clutch in one of the gear trains to drive the moving stem with its valve member at a predetermined speed to a predetermined point of its movement whereupon the switch is so actuated as to cause the other of the solenoids to be energized which through its armature, operating lever, actuating arm, links and arms will move the yoke members to engage the other clutch in the other gear train to drive the moving stem with its valve member at a different speed.

HAROLD O. KRON.

REFERENCES CITED

The following references are of record in the file of this patent:

UNITED STATES PATENTS

| Number | Name | Date |
|---|---|---|
| 863,966 | Billeter | Aug. 20, 1907 |
| 1,529,005 | Beckwith | Mar. 10, 1925 |
| 1,814,424 | Barr | July 14, 1931 |
| 2,315,389 | Benson | Mar. 30, 1943 |
| 2,323,070 | Meyer | June 29, 1943 |
| 2,329,354 | McCarter | Sept. 14, 1943 |
| 2,511,539 | Orr | June 13, 1950 |

FOREIGN PATENTS

| Number | Country | Date |
|---|---|---|
| 286,403 | Great Britain | Mar. 8, 1928 |
| 330,873 | Great Britain | June 19, 1930 |